United States Patent
Wang (10) Patent No.: US 11,474,853 B2
(45) Date of Patent: *Oct. 18, 2022

(54) STORAGE DEVICE OPERATION METHOD AND PHYSICAL SERVER

(71) Applicant: Huawei Cloud Computing Technologies Co., Ltd., Guizhou (CN)

(72) Inventor: Shen Wang, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 35 days.

This patent is subject to a terminal disclaimer.

(21) Appl. No.: 17/199,794

(22) Filed: Mar. 12, 2021

(65) Prior Publication Data
US 2021/0200571 A1     Jul. 1, 2021

Related U.S. Application Data

(63) Continuation of application No. 16/396,213, filed on Apr. 26, 2019, now Pat. No. 10,970,105, which is a
(Continued)

(30) Foreign Application Priority Data

Oct. 28, 2016   (CN) .......................... 201610970830.6

(51) Int. Cl.
*G06F 12/00*     (2006.01)
*G06F 9/455*     (2018.01)
(Continued)

(52) U.S. Cl.
CPC ........ *G06F 9/45558* (2013.01); *G06F 9/5016* (2013.01); *H04L 67/1097* (2013.01);
(Continued)

(58) Field of Classification Search
CPC ............... G06F 9/45558; G06F 9/5016; G06F 2009/45562; G06F 2009/45579;
(Continued)

(56) References Cited

U.S. PATENT DOCUMENTS 9,378,049 B1    6/2016  Johnson
2008/0140866 A1  6/2008  Corry et al.
(Continued)

FOREIGN PATENT DOCUMENTS

CN   102591702 A    7/2012
CN   102662777 A    9/2012
(Continued)

*Primary Examiner* — Jason W Blust
(74) *Attorney, Agent, or Firm* — Conley Rose, P.C.

(57) ABSTRACT

A storage device operation method is applied to the physical server. A storage card is inserted into the physical server. When a virtual machine on the physical server receives a data read/write instruction, the virtual machine generates an I/O request for a physical storage device, and sends the I/O request to a client in the storage card; the client transmits the I/O request to a server, so that the server performs an I/O operation on the physical storage device based on the I/O request. Since the virtual machine directly sends the I/O request to the client in the storage card without using a hypervisor in the physical server, computing resources of the physical server are conserved.

20 Claims, 6 Drawing Sheets

Related U.S. Application Data continuation of application No. PCT/CN2017/095912, filed on Aug. 4, 2017.

(51) Int. Cl.
*G06F 9/50* (2006.01)
*H04L 67/1097* (2022.01)

(52) U.S. Cl.
CPC .............. *G06F 2009/45562* (2013.01); *G06F 2009/45579* (2013.01); *G06F 2009/45595* (2013.01)

(58) Field of Classification Search
CPC ........... G06F 2009/45595; G06F 3/061; G06F 3/0635; G06F 3/067; G06F 9/5077; G06F 3/06; H04L 67/1097
See application file for complete search history.

(56) References Cited

U.S. PATENT DOCUMENTS

| | | |
|---|---|---|
| 2012/0102491 A1 | 4/2012 | Maharana |
| 2013/0174155 A1 | 7/2013 | Yang et al. |
| 2016/0364346 A1 | 12/2016 | Yang et al. |

FOREIGN PATENT DOCUMENTS

| | | |
|---|---|---|
| CN | 104951252 A | 9/2015 |
| CN | 105824682 A | 8/2016 |
| CN | 106569874 A | 4/2017 |

STORAGE DEVICE OPERATION METHOD AND PHYSICAL SERVER

CROSS-REFERENCE TO RELATED APPLICATIONS

This is a continuation of U.S. patent application Ser. No. 16/396,213, filed on Apr. 26, 2019, which is a continuation of Int'l Patent App. No. PCT/CN2017/095912, filed on Aug. 4, 2017, which claims priority to Chinese Patent App. No. 201610970830.6, filed on Oct. 28, 2016, all of which are incorporated by reference.

FIELD

The present application relates to the field of computer technologies, and in particular, to a storage device operation method and a physical server.

BACKGROUND

With rapid development of computer technologies, a distributed storage system is increasingly widely applied to large-scale data storage because of its advantages such as reliability, inexpensiveness and easy scalability. The distributed storage system can provide storage resources for a physical server, and the distributed storage system usually may include two software control ends: a client and a server. The client may be configured in the physical server, to provide a storage function for a virtual machine in the physical server, and the server may be configured in the physical server or another physical server, to manage a physical storage device deployed in the distributed storage system. When the physical server uses the distributed storage system, the virtual machine in the physical server usually performs an input/output (I/O) operation on the physical storage device in the distributed storage system, to write or read operating data in the virtual machine into or from the physical storage device.

Figure 1:
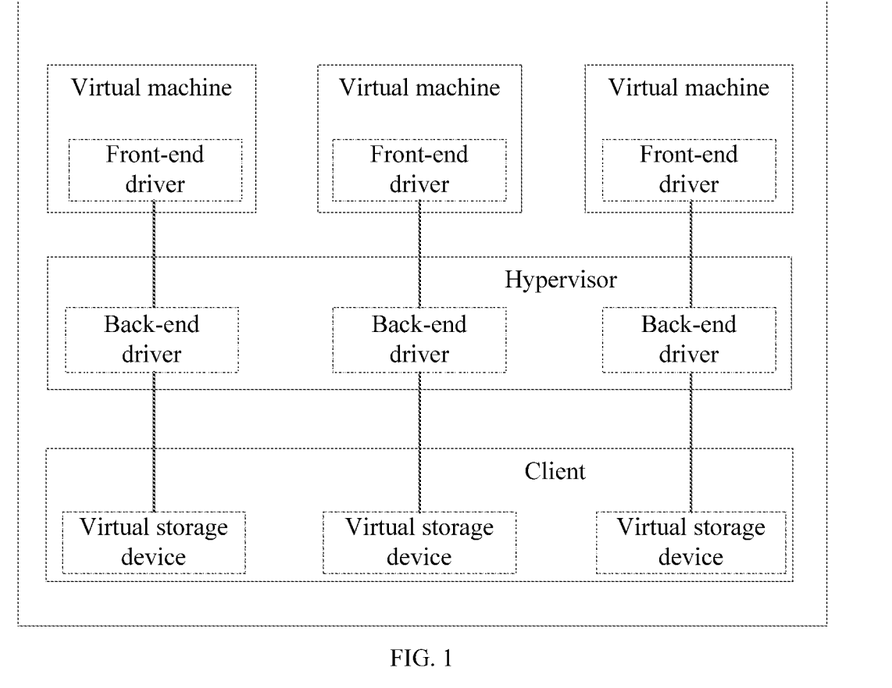
FIG. 1 is a schematic diagram of a storage device operation method according to related technologies.

Currently, the client of the distributed storage system is directly deployed in the physical server. In this case, if the virtual machine in the physical server needs to perform an I/O operation on the physical storage device in the distributed storage system, the I/O operation needs to be implemented based on a hypervisor in the physical server. The hypervisor is an intermediate software layer running between a physical hardware layer and a virtual machine layer, and is responsible for coordinating access to hardware resources and for protection between virtual machines. Specifically, as shown in FIG. 1, a correspondence between a front-end driver in the virtual machine and a back-end driver in a hypervisor is established, and a correspondence between the back-end driver in the hypervisor and a virtual storage device in a client is established. Then, the virtual machine can send an I/O request to the client by using the front-end driver and the back-end driver. When receiving the I/O request, the client can send the I/O request to the server in the distributed storage system, so that the server performs an I/O operation on the physical storage device based on the I/O request.

Because the client of the distributed storage system is directly deployed in the physical server, during a running process, the client and the back-end driver in the hypervisor consume physical computing resources, such as a physical central processing unit (CPU) resource and physical memory, in the physical server. In addition, during a running process, the front-end driver in the virtual machine consumes virtual computing resources, such as a virtual CPU resource and virtual memory, in the physical server. Consequently, a relatively large amount of computing resources is consumed during a process of using the distributed storage system by the physical server.

SUMMARY

To resolve problems of related technologies, embodiments of the present application provide a storage device operation method and a physical server. The technical solutions are as follows.

According to a first aspect, a storage device operation method is provided, and applied to a physical server, where a virtual machine is installed on the physical server, and a storage card is inserted into the physical server; and the method includes: when the virtual machine receives a data read/write instruction, generating an input/output I/O request for a physical storage device; sending, by the virtual machine, the I/O request to a client in the storage card, where the storage card can directly communicate with the virtual machine; and when the client receives the I/O request, sending the I/O request to a server, so that the server performs an I/O operation on the physical storage device based on the I/O request, where a distributed storage system includes the client and the server, the client is configured to provide a storage function for the virtual machine, and the server is configured to manage the physical storage device.

It should be noted that an embedded system runs on the storage card. To be specific, the storage card may include modules such as a CPU and a memory. For example, the storage card may be a Peripheral Component Interconnect (PCI) card or a Peripheral Component Interconnect Express (PCIe) card, or may be another storage card or the like that can directly communicate with the virtual machine. This is not specifically limited in this embodiment of the present application.

In this embodiment of the present application, because the storage card can directly communicate with the virtual machine, when sending the I/O request to the client in the storage card, the virtual machine can send the I/O request to the client without using a hypervisor in the physical server, thereby saving computing resources of the physical server. In addition, because the client in this embodiment of the present application is deployed on the storage card, during a running process, the client consumes computing resources of the storage card rather than computing resources of the physical server, thereby further saving computing resources of the physical server.

The sending, by the virtual machine, the I/O request to a client in the storage card includes: sending, by the virtual machine, the I/O request to a target virtual interface of the storage card, where the target virtual interface is a virtual interface corresponding to the virtual machine; and when the target virtual interface of the storage card receives the I/O request, sending the I/O request to a target virtual storage device in the client, where the target virtual storage device is a virtual storage device corresponding to the target virtual interface.

It should be noted that when the virtual machine sends the I/O request to the target virtual interface of the storage card, a storage card driver in the virtual machine may send the I/O request to the target virtual interface of the storage card.

In this embodiment of the present application, the virtual machine can directly send the I/O request to the client by using the target virtual interface of the storage card without using the hypervisor in the physical server in this sending process, thereby omitting participation of a front-end driver and a back-end driver in related technologies, and therefore greatly saving computing resources of the physical server.

Further, before the sending, by the virtual machine, the I/O request to a client in the storage card, the method further includes: when a first setting instruction is received, invoking a management interface of the storage card to generate N virtual interfaces, and invoking a management interface of the client to generate M virtual storage devices, where the N virtual interfaces include the target virtual interface, the M virtual storage devices include the target virtual storage device, and both N and M are natural numbers not less than 1; and establishing a correspondence between the target virtual interface and the virtual machine, and establishing a correspondence between the target virtual interface and the target virtual storage device.

It should be noted that the first setting instruction may be manually triggered by a user, or may be automatically triggered by a management system of the physical server, and the first setting instruction is used to instruct to establish a communication path between the virtual machine and the client in the storage card based on the target virtual interface of the storage card.

In addition, establishing the correspondence between the target virtual interface and the virtual machine means associating the target virtual interface with the virtual machine, or means allocating the target virtual interface to the virtual machine for use. Establishing the correspondence between the target virtual interface and the target virtual storage device means associating the target virtual interface with the target virtual storage device, or means allocating the target virtual storage device to the virtual machine corresponding to the target virtual interface for use.

In this embodiment of the present application, the correspondence between the target virtual interface and the virtual machine can be established, and the correspondence between the target virtual interface and the target virtual storage device can be established. The two correspondences are established, which means that the communication path between the virtual machine and the client in the storage card is established, so that subsequently, the virtual machine sends the I/O request to the client in the storage card based on the communication path.

The sending, by the virtual machine, the I/O request to a client in the storage card includes: sending, by the virtual machine, the I/O request to a physical interface of the storage card; and when the physical interface of the storage card receives the I/O request, sending the I/O request to a virtual storage device in the client.

It should be noted that when the virtual machine sends the I/O request to the physical interface of the storage card, the storage card driver in the virtual machine may send the I/O request to the physical interface of the storage card.

In this embodiment of the present application, the virtual machine can directly send the I/O request to the client by using the physical interface of the storage card without using the hypervisor in the physical server in this sending process, thereby omitting participation of a front-end driver and a back-end driver in related technologies, and therefore greatly saving computing resources of the physical server.

Further, before the sending, by the virtual machine, the I/O request to a client in the storage card, the method further includes: when a second setting instruction is received, invoking a management interface of the client to generate M virtual storage devices; and establishing a correspondence between the physical interface of the storage card and the virtual machine, and establishing a correspondence between the physical interface of the storage card and the M virtual storage devices.

It should be noted that the second setting instruction may be manually triggered by a user, or may be automatically triggered by a management system of the physical server, and the second setting instruction is used to instruct to establish a communication path between the virtual machine and the client in the storage card based on the physical interface of the storage card.

In this embodiment of the present application, the correspondence between the physical interface of the storage card and the virtual machine can be established, and the correspondence between the physical interface of the storage card and the M virtual storage devices can be established. The two correspondences are established, which means that the communication path between the virtual machine and the client in the storage card is established, so that subsequently, the virtual machine sends the I/O request to the client in the storage card based on the communication path.

It should be noted that the server is deployed on the storage card; or the server is deployed on another physical server different from the physical server.

According to a second aspect, a physical server is provided, where a virtual machine is installed on the physical server, and a storage card is inserted into the physical server; and the physical server includes: the virtual machine configured to: when receiving a data read/write instruction, generate an input/output I/O request for a physical storage device, where the virtual machine is further configured to send the I/O request to a client in the storage card, where the storage card can directly communicate with the virtual machine; and the client configured to: when receiving the I/O request, send the I/O request to a server, so that the server performs an I/O operation on the physical storage device based on the I/O request, where a distributed storage system includes the client and the server, the client is configured to provide a storage function for the virtual machine, and the server is configured to manage the physical storage device.

The virtual machine is further configured to send the I/O request to a target virtual interface of the storage card, where the target virtual interface is a virtual interface corresponding to the virtual machine; and the storage card is configured to: when the target virtual interface receives the I/O request, send the I/O request to a target virtual storage device in the client, where the target virtual storage device is a virtual storage device corresponding to the target virtual interface.

Further, the physical server further includes: a processor configured to: when receiving a first setting instruction, invoke a management interface of the storage card to generate N virtual interfaces, and invoke a management interface of the client to generate M virtual storage devices, where the N virtual interfaces include the target virtual interface, the M virtual storage devices include the target virtual storage device, and both N and M are natural numbers not less than 1, where the processor is further configured to establish a correspondence between the target virtual interface and the virtual machine, and establish a correspondence between the target virtual interface and the target virtual storage device.

The virtual machine is further configured to send the I/O request to a physical interface of the storage card; and the storage card is configured to: when the physical interface receives the I/O request, send the I/O request to a virtual storage device in the client.

Further, the physical server further includes: a processor configured to: when receiving a second setting instruction, invoke a management interface of the client to generate M virtual storage devices, where the processor is further configured to establish a correspondence between the physical interface of the storage card and the virtual machine, and establish a correspondence between the physical interface of the storage card and the M virtual storage devices.

It should be noted that the server is deployed on the storage card; or the server is deployed on another physical server different from the physical server.

According to a third aspect, a physical server is provided, where the physical server includes a first processor and a first memory, a storage card is inserted into the physical server, and the storage card includes a second processor and a second memory.

The first processor executes an instruction in the first memory, so that the physical server performs the following operations: when a data read/write instruction is received, generating an input/output I/O request for a physical storage device; and sending the I/O request to a client in the storage card, where the storage card can directly communicate with the virtual machine.

The second processor executes an instruction in the second memory, so that the storage card performs the following operation: when the I/O request is received, sending the I/O request to a server, so that the server performs an I/O operation on the physical storage device based on the I/O request, where a distributed storage system includes the client and the server, the client is configured to provide a storage function for the virtual machine, and the server is configured to manage the physical storage device.

The first processor executes the instruction in the first memory, so that the physical server further performs the following operation: sending the I/O request to a target virtual interface of the storage card, where the target virtual interface is a virtual interface corresponding to the virtual machine.

The second processor executes the instruction in the second memory, so that the storage card performs the following operation: when the target virtual interface receives the I/O request, sending the I/O request to a target virtual storage device in the client, where the target virtual storage device is a virtual storage device corresponding to the target virtual interface.

Further, the first processor executes the instruction in the first memory, so that the physical server further performs the following operations: when a first setting instruction is received, invoking a management interface of the storage card to generate N virtual interfaces, and invoking a management interface of the client to generate M virtual storage devices, where the N virtual interfaces include the target virtual interface, the M virtual storage devices include the target virtual storage device, and both N and M are natural numbers not less than 1; and establishing a correspondence between the target virtual interface and the virtual machine, and establishing a correspondence between the target virtual interface and the target virtual storage device.

The first processor executes the instruction in the first memory, so that the physical server further performs the following operation: sending the I/O request to a physical interface of the storage card.

The second processor executes the instruction in the second memory, so that the storage card further performs the following operation: when the physical interface receives the I/O request, sending the I/O request to a virtual storage device in the client.

Further, the first processor executes the instruction in the first memory, so that the physical server further performs the following operations: when a second setting instruction is received, invoking a management interface of the client to generate M virtual storage devices; and establishing a correspondence between the physical interface of the storage card and the virtual machine, and establishing a correspondence between the physical interface of the storage card and the M virtual storage devices.

It should be noted that the server is deployed on the storage card; or the server is deployed on another physical server different from the physical server.

According to a fourth aspect, an embodiment of the present application provides a computer storage medium configured to store a computer software instruction used by the physical servers provided in the second aspect and the third aspect, or configured to store a program designed for the physical server according to the second aspect and the third aspect.

Technical effects obtained in the second aspect and the third aspect of the foregoing embodiments of the present application are similar to those obtained by using a corresponding technical means in the first aspect, and details are not described herein again.

Beneficial effects brought by the technical solutions provided in the embodiments of the present application are as follows: In the embodiments of the present application, when receiving the data read/write instruction, the virtual machine generates the input/output I/O request for the physical storage device, and sends the I/O request to the client in the storage card. Because the storage card can directly communicate with the virtual machine, when sending the I/O request to the client in the storage card, the virtual machine can directly send the I/O request to the client without using the hypervisor in the physical server, thereby saving computing resources of the physical server. Then, when receiving the I/O request, the client sends the I/O request to the server, so that the server performs an I/O operation on the physical storage device based on the I/O request. Because the client in the embodiments of the present application is deployed on the storage card, during a running process, the client consumes computing resources of the storage card rather than computing resources of the physical server, thereby further saving computing resources of the physical server.

BRIEF DESCRIPTION OF THE DRAWINGS

To describe the technical solutions in the embodiments of the present application more clearly, the following briefly describes the accompanying drawings for describing the embodiments. The accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the present application clearer, the following further describes the embodiments of the present application in detail with reference to the accompanying drawings.

Before the embodiments of the present application are explained and described in detail, an application scenario of the embodiments of the present application is first described. A distributed storage system can provide storage resources for a physical server, and the distributed storage system usually may include a client and a server. The client is configured to provide a storage function for a virtual machine in the physical server, and the server is configured to manage a physical storage device deployed in the distributed storage system.

Figure 2A:
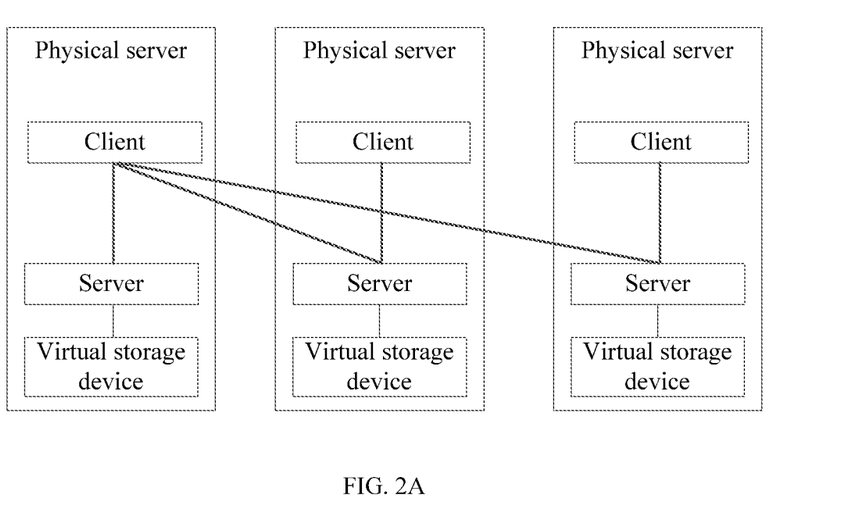
FIG. 2A is a schematic diagram of a converged deployment manner of a distributed storage system according to an embodiment of the present application.
Figure 2B:
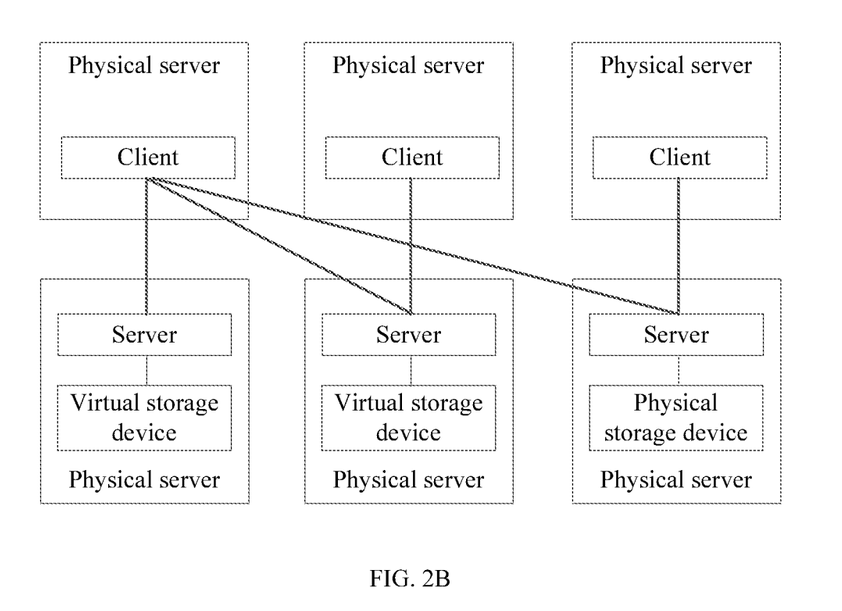
FIG. 2B is a schematic diagram of a separate deployment manner of a distributed storage system according to an embodiment of the present application.

The distributed storage system is mainly deployed in two manners: converged deployment and separate deployment. FIG. 2A is a schematic diagram of a converged deployment manner of a distributed storage system. As shown in FIG. 2A, both a client and a server may be deployed on a same physical server, and a client on each physical server can access a server on the physical server, and can also access a server on another physical server. FIG. 2B is a schematic diagram of a separate deployment manner of a distributed storage system. As shown in FIG. 2B, a client and a server may be deployed separately on different physical servers, and each client can access servers on a plurality of different physical servers.

Figure 2C:
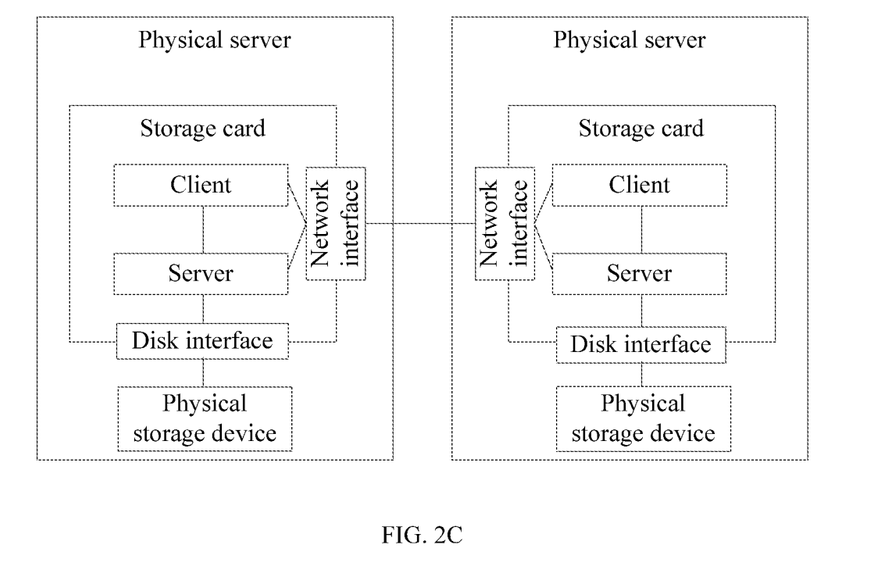
FIG. 2C is a schematic diagram of another converged deployment manner of a distributed storage system according to an embodiment of the present application.
Figure 2D:
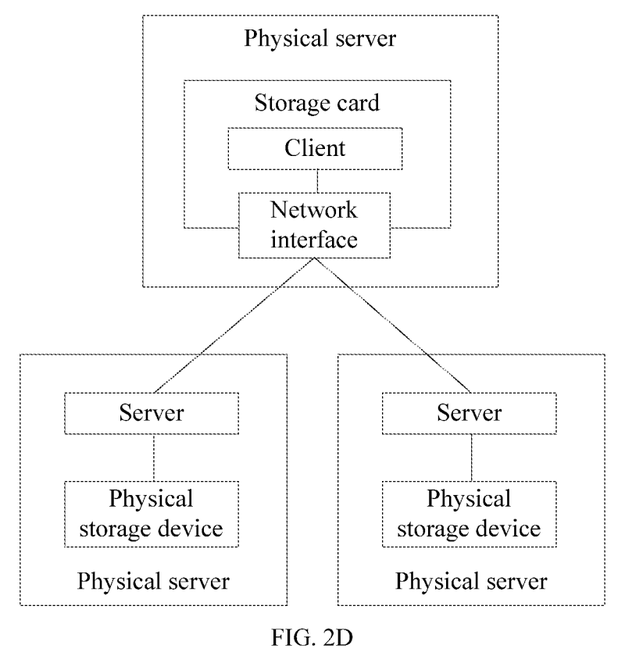
FIG. 2D is a schematic diagram of another separate deployment manner of a distributed storage system according to an embodiment of the present application.

It should be noted that, in the embodiments of the present application, the client of the distributed storage system may be deployed on a storage card, and the storage card may be inserted into a physical server. In this case, when the distributed storage system is deployed in a converged manner, as shown in FIG. 2C, both the client and the server of the distributed storage system may be deployed on the storage card, a client in each storage card can access a server in the storage card, and can also access a server in another storage card by using a network interface of the storage card, and the server in each storage card can manage a physical storage device by using a disk interface of the storage card. When the distributed storage system is deployed in a separate manner, as shown in FIG. 2D, only a client of the distributed storage system may be deployed on a storage card, a server of the distributed storage system is directly deployed on a physical server, and each client can access servers on a plurality of different physical servers by using a network interface of the storage card. The network interface of the storage card is configured to connect to a network. For example, the network interface of the storage card may be directly connected to a network cable, an optical fiber cable, and the like.

It should be noted that when the storage card is inserted into a physical server, the storage card can directly communicate with a virtual machine in the physical server. To be specific, the storage card can be allocated in a pass-through manner to the virtual machine in the physical server for use. In addition, an embedded system runs on the storage card. To be specific, the storage card may include modules such as a CPU and a memory. For example, the storage card may be a PCI card or a PCIe card, or may be another storage card that has a pass-through function, or the like. This is not specifically limited in the embodiments of the present application.

In addition, when the storage card is inserted into the physical server, the storage card may be directly inserted into the physical server by using a physical bus. For example, when the storage card is a PCI card, the PCI card can be inserted into the physical server by using a PCI bus; or when the storage card is a PCIe card, the PCIe card can be inserted into the physical server by using a PCIe bus.

Figure 3:
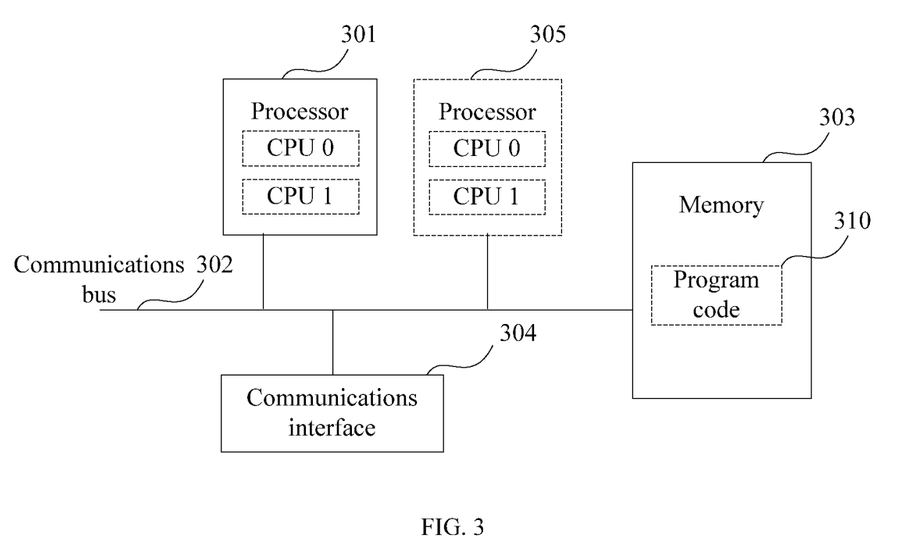
FIG. 3 is a schematic structural diagram of a physical server according to an embodiment of the present application.

FIG. 3 is a schematic structural diagram of a physical server according to an embodiment of the present application. The physical server may be the physical server, shown in FIG. 2C or FIG. 2D, into which a storage card is inserted. Referring to FIG. 3, the physical server includes at least one processor 301, a communications bus 302, a memory 303, and at least one communications interface 304.

The processor 301 may be a general purpose CPU, a microprocessor, an application-specific integrated circuit (ASIC), or one or more integrated circuits configured to control program execution in the solutions of the present application.

The communications bus 302 may include a path, to transfer information between the foregoing components.

The memory 303 may be a read-only memory (ROM), a random-access memory (RAM), another type of static storage device capable of storing static information and an instruction, or another type of dynamic storage device capable of storing information and an instruction, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), a magnetic disk storage medium, or another magnetic storage device, or any other medium that can carry or store expected program code having an instruction or data structure form and can be accessed by the physical server. However, this is not limited thereto. The memory 303 may exist independently, or the memory 303 is connected to the processor 301 by using the communications bus 302, or integrated with the processor 301.

The communications interface 304 uses any apparatus such as a transceiver to communicate with another device or a communications network, for example, an Ethernet, a radio access network (RAN), or a wireless local area network (WLAN).

During specific implementation, in an embodiment, the processor 301 may include one or more CPUs, for example, a CPU 0 and a CPU 1 shown in FIG. 3.

During specific implementation, in an embodiment, the physical server may include a plurality of processors, for example, the processor 301 and a processor 305 shown in FIG. 3. Each of these processors may be a single-core processor (single-CPU), or may be a multi-core processor (multi-CPU). The processor herein may be one or more devices, circuits, and/or processing cores configured to process data.

The memory 303 is configured to store program code 310 that executes the solutions of the present application, and the processor 301 is configured to execute the program code 310 stored in the memory 303. The physical server can implement a storage device operation method provided in the following embodiment shown in FIG. 4A by using the processor 301 and the program code 310 in the memory 303.

Figure 4A:
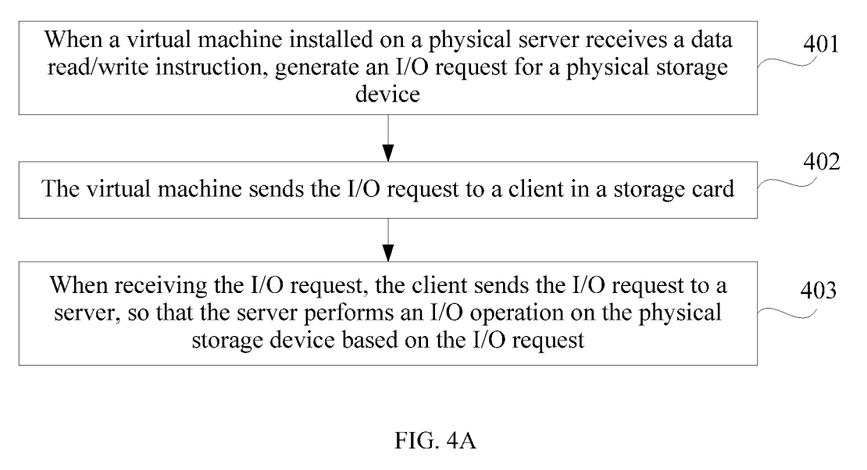
FIG. 4A is a flowchart of a storage device operation method according to an embodiment of the present application.

FIG. 4A is a flowchart of a storage device operation method according to an embodiment of the present application. The method is applied to a physical server. Referring to FIG. 4A, the method includes the following steps.

Step 401: When a virtual machine installed on the physical server receives a data read/write instruction, generate an I/O request for a physical storage device.

It should be noted that the virtual machine may be installed on the physical server, and a storage card may be inserted into the physical server. The storage card can directly communicate with the virtual machine. To be specific, the storage card can communicate with the virtual machine without using a hypervisor in the physical server.

In addition, the data read/write instruction may be manually triggered by a user, or may be automatically triggered by a management system of the physical server, and the data read/write instruction is used to instruct to read data from or write data into the physical storage device.

Specifically, an application in the virtual machine may receive the data read/write instruction, then a file system in the virtual machine may convert the data read/write instruction into an access request for a logical block, and then a generic block layer in the virtual machine may convert the access request for the logical block into the I/O request for the physical storage device. Certainly, in practical application, when receiving the data read/write instruction, the virtual machine may alternatively generate the I/O request for the physical storage device in another manner. This is not specifically limited in this embodiment of the present application.

It should be noted that, for an operation of generating the I/O request for the physical storage device when the virtual machine receives the data read/write instruction, reference may be made to related technologies. This is not described in detail in this embodiment of the present application.

Step 402: The virtual machine sends the I/O request to a client in a storage card.

In order to help the virtual machine send the I/O request to the client in the storage card, further, before the virtual machine sends the I/O request to the client in the storage card, a communication path between the virtual machine and the client in the storage card needs to be first established. In addition, an operation of establishing the communication path between the virtual machine and the client in the storage card may be implemented in the following manner 1 and manner 2.

Manner 1: When a first setting instruction is received, a management interface of the storage card is invoked to generate N virtual interfaces, and a management interface of the client is invoked to generate M virtual storage devices. The N virtual interfaces include a target virtual interface, the M virtual storage devices include a target virtual storage device, and both N and M are natural numbers not less than 1. A correspondence between the target virtual interface and the virtual machine is established, and a correspondence between the target virtual interface and the target virtual storage device is established.

It should be noted that the first setting instruction may be manually triggered by the user, or may be automatically triggered by the management system of the physical server, and the first setting instruction is used to instruct to establish the communication path between the virtual machine and the client in the storage card based on the target virtual interface of the storage card.

When the management interface of the storage card is invoked to generate the N virtual interfaces, if the storage card supports the single-root I/O virtualization (SR-IOV) technology, the N virtual interfaces can be generated in the storage card by using the SR-IOV technology supported by the storage card. Certainly, in practical application, the management interface of the storage card may alternatively be invoked in another manner to generate the N virtual interfaces. This is not specifically limited in this embodiment of the present application.

It should be noted that the SR-IOV technology is a hardware-based virtualization support technology, and the SR-IOV technology is used to create, in a physical device, a plurality of virtual function (VF) interfaces that are associated with a physical function (PF) interface. The plurality of created VF interfaces can be directly allocated to the virtual machine for use, so that resources of the physical device are shared among the plurality of VF interfaces. In this embodiment of the present application, if the virtual interface of the storage card is generated by using the SR-IOV technology, the virtual interface of the storage card may be a VF interface.

When the management interface of the client is invoked to generate the M virtual storage devices, the management interface of the client can be invoked by using the management interface of the storage card, to generate the M virtual storage devices. Certainly, in practical application, the management interface of the client may alternatively be invoked in another manner to generate the M virtual storage devices. This is not specifically limited in this embodiment of the present application.

It should be noted that, establishing the correspondence between the target virtual interface and the virtual machine means associating the target virtual interface with the virtual machine, or means allocating the target virtual interface to the virtual machine for use. Establishing the correspondence between the target virtual interface and the target virtual storage device means associating the target virtual interface with the target virtual storage device, or means allocating the target virtual storage device to the virtual machine corresponding to the target virtual interface for use.

In addition, operations of establishing the correspondence between the target virtual interface and the virtual machine and establishing the correspondence between the target virtual interface and the target virtual storage device may be performed by the hypervisor in the physical server. In this case, the hypervisor in the physical server can exchange information with the storage card by using the management interface of the storage card. Certainly, in practical application, the operations may alternatively be performed by another module in the physical server. This is not specifically limited in this embodiment of the present application.

Furthermore, during establishment of the correspondence between the target virtual interface and the virtual machine, the target virtual interface may be directly allocated to the virtual machine for use, to implement that the target virtual interface corresponds to the virtual machine. In addition, after the target virtual interface is allocated to the virtual machine for use, if the virtual machine detects the target virtual interface, a storage card driver pre-installed on the virtual machine may be loaded. The storage card driver may report the storage card as a disk controller, and scan a virtual storage device in the disk controller, that is, scan the target virtual storage device corresponding to the target virtual interface in this embodiment of the present application. After the scanning is completed, the virtual machine can learn a target virtual storage device that can be used in the storage card by the virtual machine, and subsequently the virtual machine can use the target virtual storage device.

Figure 4B:
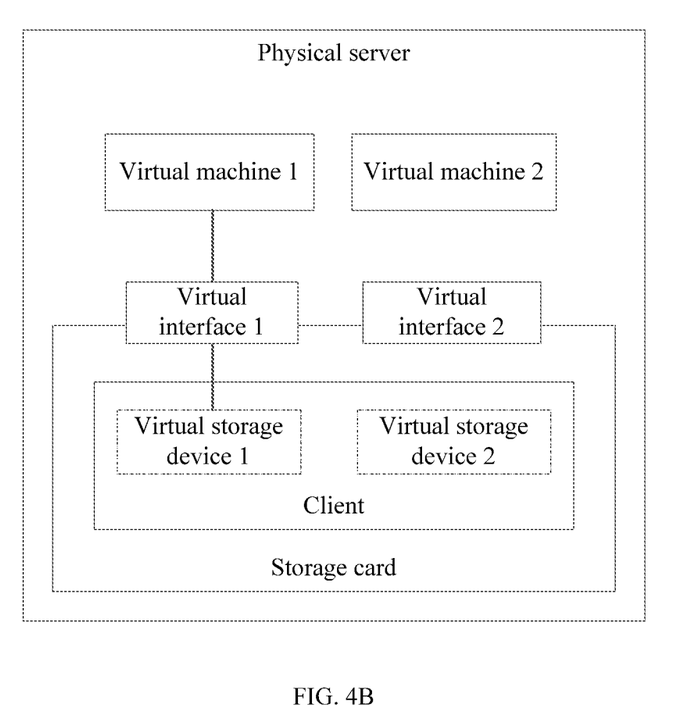
FIG. 4B is a schematic diagram of a correspondence according to an embodiment of the present application.

For example, the virtual machine is a virtual machine 1, the target virtual interface is a virtual interface 1, and the target virtual storage device is a virtual storage device 1. In this case, the correspondence between the virtual machine and the target virtual interface and the correspondence between the target virtual interface and the target virtual storage device are shown in FIG. 4B.

It should be noted that, in practical application, after the N virtual interfaces of the storage card are generated, the correspondence between the target virtual interface and the virtual machine can be established, and the correspondence between the target virtual interface and the target virtual storage device can also be established. Certainly, correspondences between the N virtual interfaces and a plurality of virtual machines in the physical server may be established, and correspondences between the N virtual interfaces and a plurality of virtual storage devices in the client may be established, so as to establish a communication path between the plurality of virtual machines in the physical server and the client, thereby facilitating subsequent use of the client by the plurality of virtual machines.

For example, a one-to-one correspondence between the N virtual interfaces and N virtual machines in the physical server may be established; or a correspondence between each virtual machine in the physical server and at least one of the N virtual interfaces may be established. For another example, a one-to-one correspondence between the N virtual interfaces and the N virtual storage devices in the client may be established; or a correspondence between each virtual interface in the N virtual interfaces and at least one virtual storage device in the client may be established.

Manner 2: When a second setting instruction is received, a management interface of the client is invoked to generate M virtual storage devices; and a correspondence between a physical interface of the storage card and the virtual machine is established, and a correspondence between the physical interface of the storage card and the M virtual storage devices is established.

It should be noted that the second setting instruction may be manually triggered by the user, or may be automatically triggered by the management system of the physical server, and the second setting instruction is used to instruct to establish the communication path between the virtual machine and the client in the storage card based on the physical interface of the storage card.

In addition, the physical interface of the storage card may be a PF interface of the storage card or the like. This is not specifically limited in this embodiment of the present application.

Establishing the correspondence between the physical interface of the storage card and the virtual machine means associating the physical interface of the storage card with the virtual machine, or means allocating the physical interface of the storage card to the virtual machine for use. Establishing the correspondence between the physical interface of the storage card and the M virtual storage devices means associating the physical interface of the storage card with the M virtual storage devices, or means allocating the M virtual storage devices to the virtual machine corresponding to the physical interface of the storage card for use.

It should be noted that operations of establishing the correspondence between the physical interface of the storage card and the virtual machine and establishing the correspondence between the physical interface of the storage card and the M virtual storage devices may be performed by the hypervisor in the physical server. In this case, the hypervisor in the physical server can exchange information with the storage card by using the management interface of the storage card. Certainly, in practical application, the operations may alternatively be performed by another module in the physical server. This is not specifically limited in this embodiment of the present application.

In addition, during establishment of the correspondence between the physical interface of the storage card and the virtual machine, the physical interface of the storage card may be directly allocated to the virtual machine for use, to implement that the physical interface of the storage card corresponds to the virtual machine. In addition, after the physical interface of the storage card is allocated to the virtual machine for use, if the virtual machine detects the physical interface of the storage card, a storage card driver pre-installed on the virtual machine may be loaded. The storage card driver may report the storage card as a disk controller, and scan a virtual storage device in the disk controller, that is, scan the M virtual storage devices corresponding to the physical interface of the storage card in this embodiment of the present application. After the scanning is completed, the virtual machine can learn M virtual storage devices that can be used in the storage card by the virtual machine, and subsequently the virtual machine can use the M virtual storage devices.

Figure 4C:
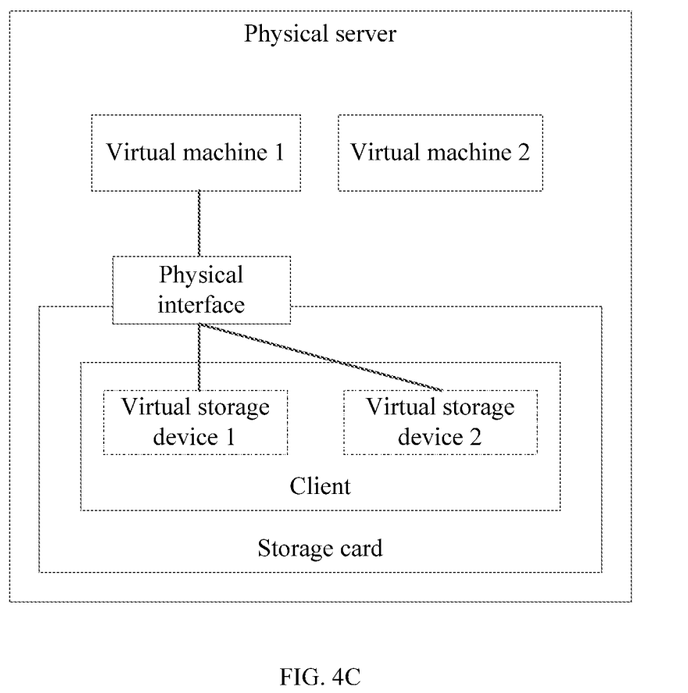
FIG. 4C is a schematic diagram of another correspondence according to an embodiment of the present application.

For example, the virtual machine is a virtual machine 1, and the M virtual storage devices are a virtual storage device 1 and a virtual storage device 2. The correspondence between the virtual machine and the physical interface of the storage card and the correspondence between the physical interface of the storage card and the M virtual storage devices are shown in FIG. 4C.

It should be noted that, in this embodiment of the present application, after the communication path between the virtual machine and the client in the storage card is established in the foregoing manner 1 and manner 2, the virtual machine can send the I/O request to the client in the storage card based on the communication path. Specifically, after the communication path between the virtual machine and the client in the storage card is established in the foregoing manner 1, the virtual machine may send the I/O request to the client in the storage card in the following manner (1); or after the communication path between the virtual machine and the client in the storage card is established in the foregoing manner 2, the virtual machine may send the I/O request to the client in the storage card in the following manner (2).

Manner (1): The virtual machine sends the I/O request to the target virtual interface of the storage card, where the target virtual interface is a virtual interface corresponding to the virtual machine. When receiving the I/O request, the target virtual interface of the storage card sends the I/O request to the target virtual storage device in the client, where the target virtual storage device is a virtual storage device corresponding to the target virtual interface.

It should be noted that when the virtual machine sends the I/O request to the target virtual interface of the storage card, the storage card driver in the virtual machine may send the I/O request to the target virtual interface of the storage card.

The correspondence between the virtual machine and the target virtual interface of the storage card and the correspondence between the target virtual interface of the storage card and the target virtual storage device in the client are pre-established in the foregoing manner 1. Therefore, when the virtual machine needs to send the I/O request to the client in the storage card, the virtual machine can directly send the I/O request to the client by using the target virtual interface of the storage card.

Manner (2): The virtual machine sends the I/O request to the physical interface of the storage card. When receiving the I/O request, the physical interface of the storage card sends the I/O request to the virtual storage device in the client.

It should be noted that when the virtual machine sends the I/O request to the physical interface of the storage card, the storage card driver in the virtual machine may send the I/O request to the physical interface of the storage card.

The correspondence between the virtual machine and the physical interface of the storage card and the correspondence between the physical interface of the storage card and the virtual storage device in the client are pre-established in the foregoing manner 2. Therefore, when the virtual machine needs to send the I/O request to the client in the storage card, the virtual machine can directly send the I/O request to the client by using the physical interface of the storage card.

It should be noted that, in related technologies, because a client is directly deployed on a physical server, a virtual machine needs to send an I/O request to the client by using a hypervisor; and because in this sending process, there is a need for joint participation of a front-end driver in the virtual machine and a back-end driver in the hypervisor, the physical server consumes a relatively large amount of computing resources. However, in this embodiment of the present application, the client is deployed on the storage card, and the storage card can directly communicate with the virtual machine. Therefore, the virtual machine can directly send the I/O request to the client without using the hypervisor, thereby omitting participation of the front-end driver and the back-end driver, and greatly saving computing resources of the physical server. In addition, because the client in this embodiment of the present application is deployed on the storage card, during a running process, the client consumes computing resources of the storage card rather than computing resources of the physical server, thereby further saving computing resources of the physical server.

Step 403: When receiving the I/O request, the client sends the I/O request to a server, so that the server performs an I/O operation on the physical storage device based on the I/O request.

It should be noted that when the server is also deployed on the storage card, the client can directly send the I/O request to the server; or when the server is not deployed on the storage card, the client can send the I/O request to the server by using a network interface of the storage card.

In addition, for a process of performing the I/O operation on the physical storage device based on the I/O request, refer to related technologies. This is not described in detail in this embodiment of the present application.

In this embodiment of the present application, when receiving the data read/write instruction, the virtual machine generates the input/output I/O request for the physical storage device, and sends the I/O request to the client in the storage card. Because the storage card can directly communicate with the virtual machine, when sending the I/O request to the client in the storage card, the virtual machine can directly send the I/O request to the client without using the hypervisor in the physical server, thereby saving computing resources of the physical server. Then, when receiving the I/O request, the client sends the I/O request to the server, so that the server performs an I/O operation on the physical storage device based on the I/O request. Because the client in this embodiment of the present application is deployed on the storage card, during a running process, the client consumes computing resources of the storage card rather than computing resources of the physical server, thereby further saving computing resources of the physical server.

Figure 5:
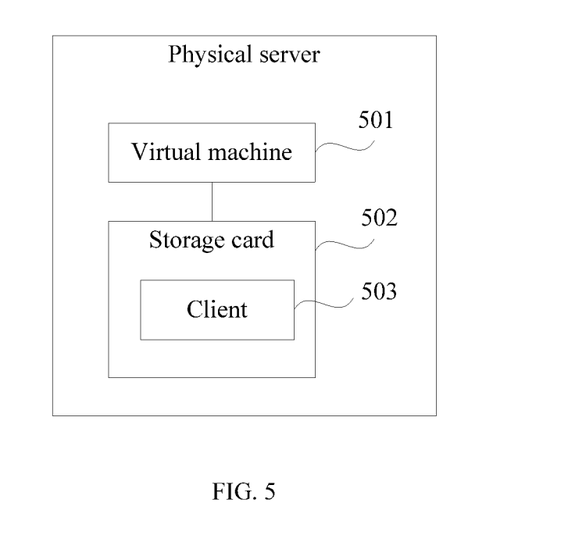
FIG. 5 is a schematic structural diagram of another physical server according to an embodiment of the present application.

FIG. 5 is a schematic structural diagram of a physical server according to an embodiment of the present application. The physical server may be the physical server shown in FIG. 3. Referring to FIG. 5, a virtual machine 501 is installed on the physical server, a storage card 502 is inserted into the physical server, and a client 503 is deployed in the storage card 502. The physical server includes: the virtual machine 501 configured to perform step 401 in the embodiment shown in FIG. 4A, where the virtual machine 501 is further configured to perform step 402 in the embodiment shown in FIG. 4A; and the client 503 configured to perform step 403 in the embodiment shown in FIG. 4A.

A distributed storage system includes the client 503 and a server, the client 503 is configured to provide a storage function for the virtual machine 501, and the server is configured to manage a physical storage device.

Optionally, the virtual machine 501 and the storage card 502 are configured to perform manner (1) in step 402 in the embodiment shown in FIG. 4A.

Optionally, the physical server further includes: a processor configured to perform manner 1 in step 402 in the embodiment shown in FIG. 4A.

Optionally, the virtual machine 501 and the storage card 502 are configured to perform manner (2) in step 402 in the embodiment shown in FIG. 4A.

Optionally, the processor is further configured to perform manner 2 in step 402 in the embodiment shown in FIG. 4A.

Optionally, the server is deployed on the storage card 502; or the server is deployed on another physical server different from the physical server.

In this embodiment of the present application, when receiving a data read/write instruction, the virtual machine generates an input/output I/O request for the physical storage device, and sends the I/O request to the client in the storage card. Because the storage card can directly communicate with the virtual machine, when sending the I/O request to the client in the storage card, the virtual machine can directly send the I/O request to the client without using a hypervisor in the physical server, thereby saving computing resources of the physical server. Then, when receiving the I/O request, the client sends the I/O request to the server, so that the server performs an I/O operation on the physical storage device based on the I/O request. Because the client in this embodiment of the present application is deployed on the storage card, during a running process, the client consumes computing resources of the storage card rather than computing resources of the physical server, thereby further saving computing resources of the physical server.

Figure 6:
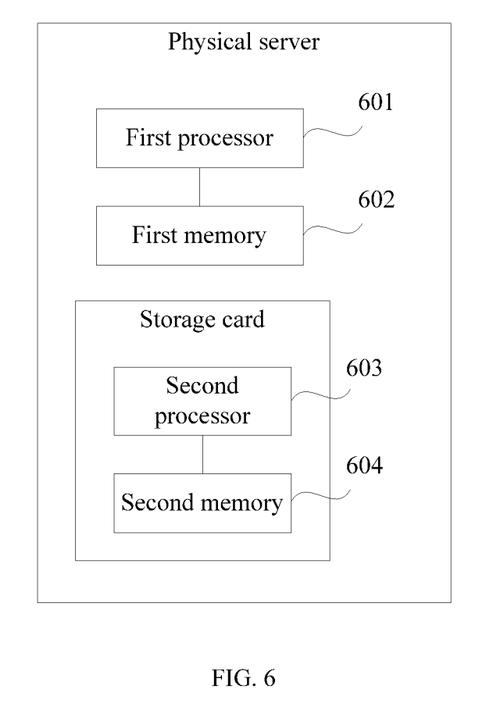
FIG. 6 is a schematic structural diagram of still another physical server according to an embodiment of the present application.

FIG. 6 is a schematic structural diagram of a physical server according to an embodiment of the present application. The physical server may be the physical server shown in FIG. 3. Referring to FIG. 6, the physical server includes a first processor 601 and a first memory 602, a storage card is inserted into the physical server, and the storage card includes a second processor 603 and a second memory 604.

The first processor 601 executes an instruction in the first memory 602, so that the physical server performs step 401 and step 402 in the embodiment shown in FIG. 4A.

The second processor 603 executes an instruction in the second memory 604, so that the storage card performs step 403 in the embodiment shown in FIG. 4A.

A distributed storage system includes a client and a server, the client is configured to provide a storage function for a virtual machine, and the server is configured to manage a physical storage device.

Optionally, the first processor 601 executes the instruction in the first memory 602, so that the physical server further performs the following operation: sending an I/O request to a target virtual interface of the storage card, where the target virtual interface is a virtual interface corresponding to the virtual machine.

The second processor 603 executes the instruction in the second memory 604, so that the storage card performs the following operation: when the target virtual interface receives the I/O request, sending the I/O request to a target virtual storage device in the client, where the target virtual storage device is a virtual storage device corresponding to the target virtual interface.

Optionally, the first processor 601 executes the instruction in the first memory 602, so that the physical server further performs manner 1 in step 402 in the embodiment shown in FIG. 4A.

Optionally, the first processor 601 executes the instruction in the first memory 602, so that the physical server further performs the following operation: sending the I/O request to a physical interface of the storage card.

The second processor 603 executes the instruction in the second memory 604, so that the storage card performs the following operation: when the physical interface receives the I/O request, sending the I/O request to a virtual storage device in the client.

Further, the first processor 601 executes the instruction in the first memory 602, so that the physical server further performs manner 2 in step 402 in the embodiment shown in FIG. 4A.

It should be noted that the server is deployed on the storage card; or the server is deployed on another physical server different from the physical server.

In this embodiment of the present application, when receiving a data read/write instruction, the virtual machine generates the input/output I/O request for the physical storage device, and sends the I/O request to the client in the storage card. Because the storage card can directly communicate with the virtual machine, when sending the I/O request to the client in the storage card, the virtual machine can directly send the I/O request to the client without using a hypervisor in the physical server, thereby saving computing resources of the physical server. Then, when receiving the I/O request, the client sends the I/O request to the server, so that the server performs an I/O operation on the physical storage device based on the I/O request. Because the client in this embodiment of the present application is deployed on the storage card, during a running process, the client consumes computing resources of the storage card rather than computing resources of the physical server, thereby further saving computing resources of the physical server.

It should be noted that the physical server provided in the foregoing embodiment is based on a same concept as the storage device operation method embodiment. For a specific implementation process thereof, refer to the method embodiment. Details are not described herein again.

A person of ordinary skill in the art may understand that all or some of the steps of the embodiments may be implemented by hardware or a program instructing related hardware. The program may be stored in a computer readable storage medium. The foregoing storage medium may be a read-only memory, a magnetic disk, a compact disc, or the like.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A physical server configured to connect to a distributed storage system and comprising:
    a first processor;
    a first memory;
    a local physical storage device;
    a virtual machine configured to send an input/output (I/O) request; and
    a storage card inserted into the physical server and comprising:
        a second processor;
        a second memory;
        a disk interface connected to the local physical storage device;
        a client deployed on the storage card and configured to:
            provide a storage function for the virtual machine,
            receive the I/O request from the virtual machine, and
            send the I/O request; and
        a server end configured to:
            manage the local physical storage device deployed in the distributed storage system, and
            receive the I/O request from the client to perform an I/O operation on the local physical storage device.

2. The physical server of claim 1, wherein the storage card is configured to support single-root I/O virtualization (SR-IOV) technology.

3. The physical server of claim 2, wherein the storage card is further configured to establish a communication path between the virtual machine and the storage card using the SR-IOV technology.

4. The physical server of claim 1, wherein the storage card is a Peripheral Component Interconnect Express (PCIe) card.

5. The physical server of claim 1, wherein the storage card is a Peripheral Component Interconnect (PCI) card.

6. The physical server of claim 1, wherein the storage card further comprises a first virtual interface.

7. The physical server of claim 6, wherein the virtual machine is further configured to further send the I/O request to the first virtual interface.

8. The physical server of claim 7, wherein the first virtual interface corresponds to the virtual machine.

9. A distributed storage system comprising:
    a first physical server comprising:
    a first processor;
    a first memory;
    a first local physical storage device;
    a virtual machine configured to send an input/output (I/O) request; and
    a storage card inserted into the first physical server and comprising:

a second processor;
a second memory;
a disk interface connected to the first local physical storage device;
a client deployed on the storage card and configured to:
provide a storage function for the virtual machine, receive the I/O request from the virtual machine, and send the I/O request; and
a first server end configured to:
manage the first local physical storage device deployed in the distributed storage system, and
receive the I/O request from the client to perform an I/O operation on the first local physical storage device; and
a second physical server comprising:
a second local physical storage device; and
a second server end deployed on the second physical server and configured to manage the second local physical storage device.

10. The distributed storage system of claim 9, wherein the storage card is configured to support single-root I/O virtualization (SR-IOV) technology.

11. The distributed storage system of claim 10, wherein the storage card is further configured to establish a communication path between the virtual machine and the storage card using the SR-IOV technology.

12. The distributed storage system of claim 9, wherein the storage card is a Peripheral Component Interconnect Express (PCIe) card.

13. The distributed storage system of claim 9, wherein the storage card is a Peripheral Component Interconnect (PCI) card.

14. A storage device operation method comprising:
sending, by a virtual machine installed on a first physical server, a first input/output (I/O) request to a client deployed on a storage card, wherein the first physical server comprises a first processor and a first memory, and wherein the storage card is inserted into the first physical server and comprises a second processor, a second memory, and a disk interface connecting with a first local physical storage device; and
sending, by the client, the first I/O request to a first server end of a distributed system to perform a first I/O operation on the first local physical storage device,
wherein the client is configured to provide a storage function for the virtual machine, and
wherein the first server end is deployed on the storage card for managing the first local physical storage device.

15. The storage device operation method of claim 14, further comprising sending, by the virtual machine, a second I/O request to the client.

16. The storage device operation method of claim 15, further comprising sending, by the client, the second I/O request to a second server end of the distributed system to perform a second I/O operation on a second local physical storage of a second physical server.

17. The storage device operation method of claim 16, wherein the second server end is deployed on the second physical server.

18. The storage device operation method of claim 14, further comprising generating, by the first processor, a setting instruction.

19. The storage device operation method of claim 18, further comprising invoking, by the first processor, a management interface of the storage card based on the setting instruction.

20. The storage device operation method of claim 19, further comprising generating, by the client, M virtual storage devices through the management interface.

* * * * *